United States Patent Office 3,188,320
Patented June 8, 1965

3,188,320
DIHYDRODIBENZOTHIAZEPINES
Francis A. Sowinski, Edison, and Harry Louis Yale, New Brunswick, N.J., assignors to Olin Mathieson Chemical Corporation, New York, N.Y., a corporation of Virginia
No Drawing. Filed May 8, 1962, Ser. No. 193,316
7 Claims. (Cl. 260—327)

This application is a continuation-in-part of application Serial No. 86,003, filed January 31, 1961, now abandoned.

This invention relates to new basically substituted dihydrodibenzothiazepine (and their salts) having valuable therapeutic properties, processes for the preparation thereof, and new intermediates useful in such processes.

The therapeutically active compounds of this invention include dihydrodibenzothiazepines of the general Formula I:

(I) 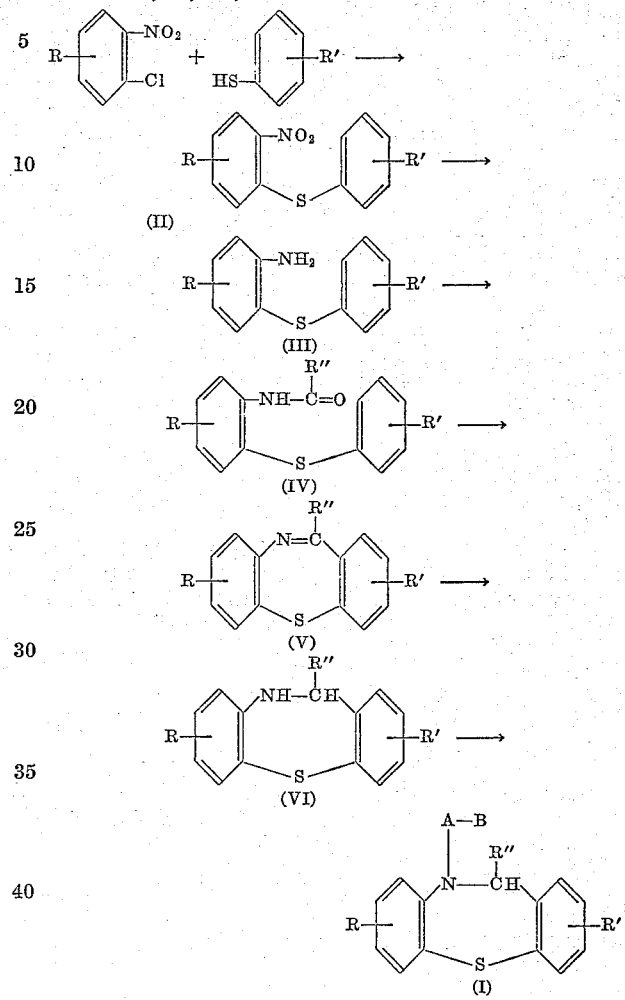

wherein A is a lower alkylene radical of at least two carbon atoms, B is lower alkylamino, benzylamino, lower alkylbenzylamino or dibenzylamino, R and R' are the same or different and represent hydrogen, halogen, lower alkyl, lower alkoxy or trifluoromethyl, and R" is hydrogen, lower alkyl, or monocyclic aryl; and salts thereof. Among the suitable radicals represented by the symbol B are methylamino, ethylamino, propylamino and the like, o-, m- or p-benzylamino, o-, m-, or p-ethylbenzylamino and the like.

The terms "lower alkyl," "lower alkoxy," and "lower alkylene," as employed herein, include both straight and branched chain radicals of less than eight carbon atoms. All four halogens are contemplated.

By monocyclic aryl radicals is meant phenyl and substituted phenyl radicals such as lower alkylphenyl, e.g. o-, m-, or p-tolyl, ethylphenyl, di-lower alkylphenyl, e.g. p-xylyl, lower alkoxyphenyl, e.g. methoxyphenyl, halophenyl, e.g. chlorophenyl, bromophenyl, etc. The particularly preferred compounds are those wherein A is a lower alkylene radical of two to three carbon atoms (i.e., ethylene, trimethylene-1,3, and propylene-1,2); B represents a methylamino radical, R is in the 8-position and represents hydrogen, chloro or trifluoromethyl, R' is hydrogen and R" is hydrogen or phenyl.

As to the salts of the dihydrodibenzothiazepines, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable as ataractic agents and thus may be used in the treatment of depressed psychotic states. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein R, R', R", A and B are as hereinbefore defined:

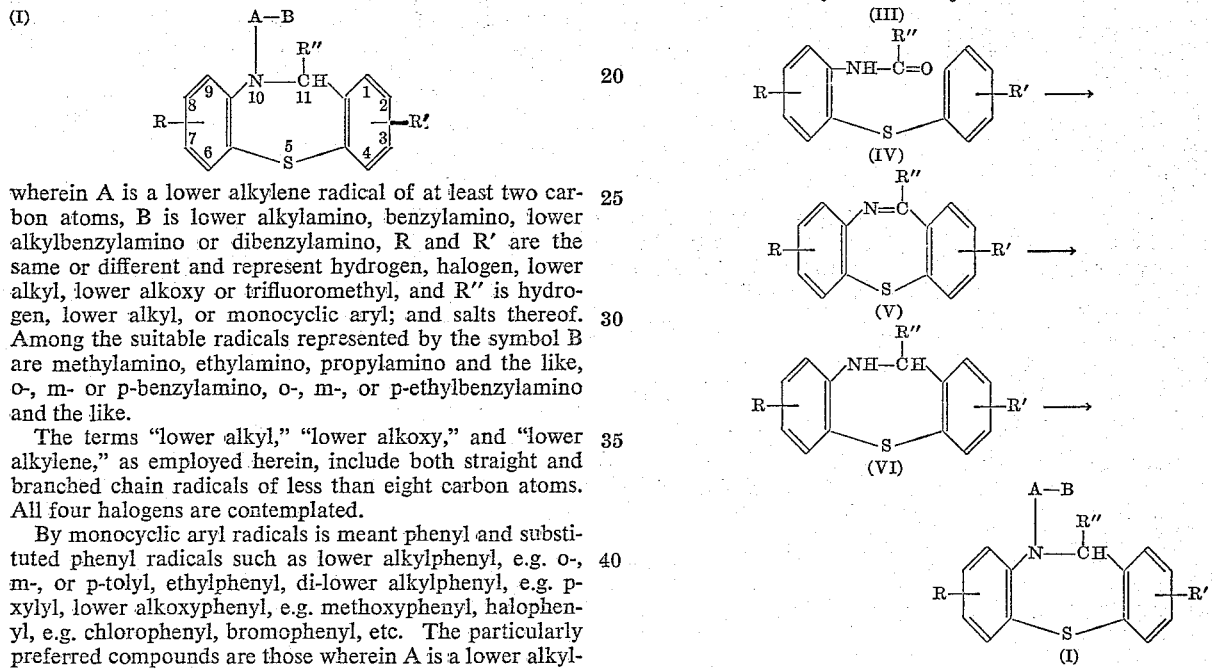

Among the suitable o-chloronitrobenzenes utilizable as initial reagents in these reactions may be mentioned: o-chloronitrobenzene; halo-o-chloronitrobenzenes, such as 2,5 - dichloronitrobenzene, 2,4 - dichloronitrobenzene, 2 - chloro-5-fluoronitrobenzene, and 2-chloro-4-fluoronitrobenzene; (lower alkyl)-o-chloronitrobenzenes, such as 5-(lower alkyl)-2-chloronitrobenzenes (e.g., 5-methyl-2-chloronitrobenzene, 5-ethyl-2-chloronitrobenzene, 5-n-propyl-2-chloronitrobenzene and 5-n-hexyl-2-chloronitrobenzene) and 4-(lower alkyl)-2-chloronitrobenzenes; (lower alkoxy)-o-chloronitrobenzenes, such as 5-(lower alkoxy)-2-chloronitrobenzenes (e.g., 5-methoxy-2-chloronitrobenzene, 5 - ethoxy - 2 - chloronitrobenzene, 5-n-propoxy-2-chloronitrobenzene and 5-n-hexyloxy-2-chloronitrobenzene); and trifluoromethyl-o-chloronitrobenzenes, such as 5-trifluoromethyl-2-chloronitrobenzene and 4-trifluoromethyl-2-chloronitrobenzene.

Among the suitable benzenethiols utilizable as initial reagents in these reactions may be mentioned: benzenethiol; halobenzenethiols, such as 2-chlorobenzenethiol, 4-chlorobenzenethiol, 2-fluorobenzenethiol, 4-fluorobenzenethiol, and 2-bromobenzenethiol; (lower alkyl)benzenethiols, such as o-toluenethiol, p-toluenethiol, 2-ethylbenzenethiol, 4-n-propylbenzenethiol and 4-n-hexylbenzenethiol; (lower alkoxy)benzenethiols, such as 2-methoxybenzenethiol, 4-methoxybenzenethiol, 4-ethoxybenzenethiol and 4-propoxybenzenethiol; and trifluoromethylbenzenethiols, such as 2-trifluoromethylbenzenethiol and 4-trifluoromethylbenzenethiol.

In the initial reaction of the process of this invention, the o-chloronitrobenzene is reacted with the benzenethiol, the reaction preferably being conducted in the presence of a condensation agent such as a base (e.g., sodium hydroxide), whereby a corresponding 2-nitrophenyl phenyl sulfide (Compounds II) is formed. The nitro group is then reduced to an amine by treatment with a reducing agent such as nascent hydrogen, which may be formed in situ by the action of an electropositive metal on an acid, thereby forming the corresponding 2-(phenylthio)aniline derivative (Compounds III).

If a final compound is desired which is unsubsituted in the 11-position, the 2-(phenylthio)aniline is then treated with formic acid whereby the corresponding 2-(phenylthio) formanilide (Compounds IV, where R'' is hydrogen) is produced. If, however, and 11-substituted product is desired, the 2-(phenylthio)aniline is reacted with a lower alkanoyl halide or an arylcarbonyl halide, whereby a corresponding acylated aniline derivative (Compound IV, wherein R'' is alkyl or aryl) is formed. Among the suitable acyl halides utilizable in this step of the process may be mentioned lower alkanoyl chlorides of at least two carbon atoms, as exemplified by acetyl chloride, propionyl chloride, butyryl chloride and hexanoyl chloride, and monocyclic aryl carbonyl chlorides, such as benzoyl chloride, o, m and p-toluyl chloride, and o,p-dimethylbenzoyl chloride.

Compounds IV are then cyclized by treatment with a mixture of polyphosphoric acid and phosphorus oxychloride at an elevated temperature (preferably about 100° C. to about 140° C.) to yield the corresponding dibenzo[b,f][1,4]thiazepine derivative (Compounds V). Compounds V are then reduced, as by treatment with a mixture of lithium aluminum hydride and aluminum chloride, to yield the corresponding 10,11-dihydrodibenzo[b,f][1,4]-thiazepine derivatives (Compounds VI).

The method for introducing the side chain in the 10-position is a feature of this invention.

To introduce a lower alkylamino-lower alkylene side chain, the nucleus of Formula VI is first treated with an N-benzyl-N-lower alkylamino-lower alkyl halide to obtain the 10-N-benzyl-N-lower alkylamino alkylene derivative of the compound of Formula VII. Treatment of the latter with benzyl chloroformate or alkylchloroformate converts the 10-substituent to the N-methyl-lower alkylcarbamic acid benzyl or alkyl ester group. The ester group is removed, for example with a hydrogen halide such as hydrogen chloride, hydrogen bromide etc. in a liquid organic acid, such as a lower fatty acid like acetic acid, propionic acid, etc., to leave an alkylamino-lower alkylene group in the 10-position. This series of reactions may be shown as follows:

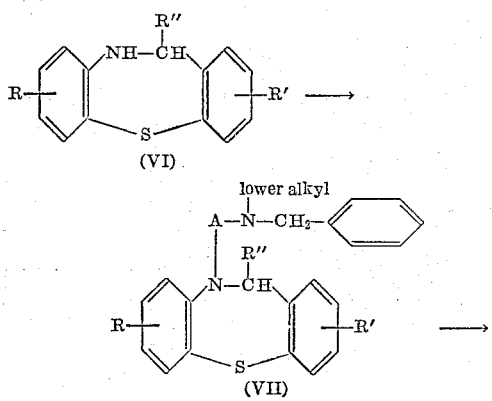

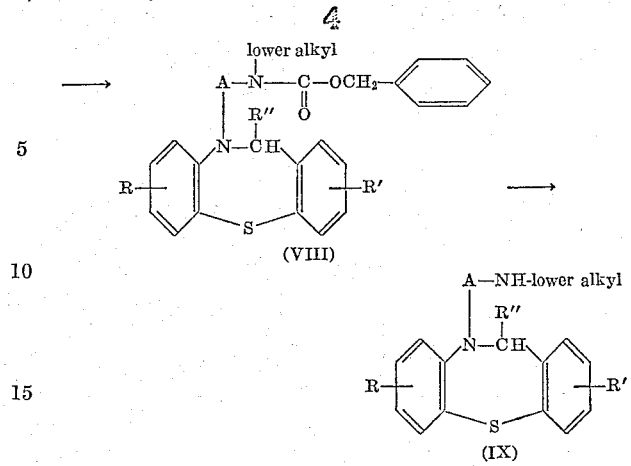

When a dibenzylamino-lower alkyl halide is substituted for the N-benzyl-N-lower alkylamino lower alkyl halide in the sequence of reactions diagrammed above, the 10-dibenzylamino-lower alkylene derivative, then the 10-monobenzylamino-lower alkylene derivative are obtained.

As an alternative method of introducing the lower alkylamino-lower alkylene side chain in the 10-position, a compound of Formula VI may be treated with an N-(ω-halo-lower alkyl)-N-lower alkylformamide to introduce the N-lower alkylformamido-lower alkylene side chain which may be hydrolyzed with dilute alcoholic-aqueous strong inorganic acid, e.g. a hydrohalic acid, such as hydrochloric acid, hydrobromic acid, etc. to give a lower alkylamino-lower alkylene group. This is illustrated by the following:

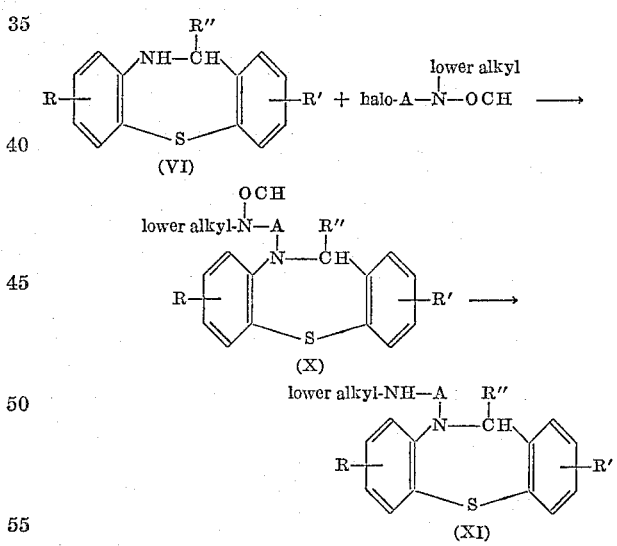

The symbols have the same meaning as previously described.

The following examples illustrate the invention (all temperatures being in centigrade).

EXAMPLE 1

*8-chloro-10,11-dihydrodibenzo[b,f][1,4]thiazepine*

(a) PREPARATION OF 4-CHLORO-2-NITROPHENYL PHENYL SULFIDE

To 211 g. of 2,5-dichloronitrobenzene and 110.2 g. of benzenethiol in 500 ml. 95% ethanol is added a solution of 44 g. of sodium hydroxide in 100 ml. of water, the mixture is refluxed for two and one-half hours, cooled and the solid filtered to give 280.4 g. of product, M.P. about 81–82°. After three crystallizations from 95% ethanol, an analytical sample melting at about 83–84° is obtained.

*Analysis.*—Calcd. for $C_{12}H_8ClNO_2S$: S, 12.06. Found: S, 12.04.

(b) PREPARATION OF 5-CHLORO-2-(PHENYLTHIO) ANILINE

To 265.7 g. of 4-chloro-2-nitrophenyl phenyl sulfide, 558 g. if iron powder and 2 l. of 95% ethanol is added 25 ml. of concentrated hydrochloric acid, dropwise. Subsequently, the mixture is heated to 55° and the spontaneous exothermic reaction which occurs is controlled by cooling. When the spontaneous reaction has subsided, the mixture is refluxed for three hours, filtered, and the filtrate concentrated to give about 227 g. of the crude product, M.P. about 62–63°. For analysis, a small sample in anyhydrous ether is treated with dry hydrogen chloride to give the hydrochloride of 5-chloro-2-(phenylthio)aniline, M.P. about 164–166°.

Analysis.—Calcd. for $C_{12}H_{10}ClNS \cdot HCl$: S, 11.78. Found: S, 12.25.

(c) PREPARATION OF 5-CHLORO-2-(PHENYLTHIO) FORMANILIDE 221.7 g. of 5-chloro-2-(phenylthio)aniline is added to a mixture of 460 g. of 98% formic acid and 102.1 g. of acetic anhydride. The mixture is refluxed for one hour, concentrated in vacuo and the residue poured on ice to give about 244 g. of product, M.P. about 47–49°. An analytical sample is obtained from a mixture of benzene and ligroin, M.P. about 55–56°.

Analysis.—Calcd. for $C_{13}H_{10}ClNOS$: S, 12.16. Found: S, 12.28.

(d) PREPARATION OF 8-CHLORODIBENZO[b,f][1,4]THIAZEPINE

A well blended mixture of 50.0 g. of 5-chloro-2-(phenylthio)formanilide, 400 g. of polyphosphoric acid and 58.3 g. of phosphorous oxychloride is heated for one and one-half hours under nitrogen by means of an oil bath maintained at 120–125°. Much foaming occurs and must be controlled. The cooled mixture is treated with crushed ice, made strongly alkaline with concentrated ammonia and extracted with ether. The ether extracts are dried and concentrated to give about 53.7 g. of crude product, M.P. about 57–60°. Three recrystallizations from hexane yields a constant melting analytical sample, M.P. 78–79°.

Analysis.—Calcd. for $C_{13}H_9ClNS$: N, 5.70; S, 13.04. Found: N, 5.83; S, 13.19.

(e) PREPARATION OF 8-CHLORO-10,11-DIHYDRODIBENZO[b,f][1,4]THIAZEPINE 12.3 g. of 8-chlorodibenzo[b,f][1,4]thiazepine in 100 ml. of dry ether is added dropwise to 3.9 g. of lithium aluminum hydride and 13.3 g. of aluminum chloride in 100 ml. of dry ether. The conventional working up gives about 12.6 g. of crude product, M.P. about 122–123°. An analytical sample from 95% ethanol melts at about 126–127°.

Analysis.—Calcd. for $C_{13}H_{10}ClNS$: N, 5.65; S, 12.94. Found: N, 5.51; S, 12.79.

EXAMPLE 2

*10,11-dihydro-8-(trifluoromethyl)dibenzo[b,f][1,4]thiazepine*

(a) PREPARATION OF PHENYL-α,α,α-TRIFLUORO-2-NITRO-p-TOLYL SULFIDE

To 60.5 g. of benzenethiol, 123.9 g. of 4-chloro-3-nitrobenzotrifluoride and 500 ml. of 95% ethanol is added 20 g. of sodium hydroxide in 50 ml. of water. The reaction mixture is then refluxed for two hours and worked up to give the crude product, M.P. about 69–70°. An analytical sample from absolute ethanol melts at about 70–71°.

Analysis.—Calcd for. $C_{13}H_8F_3NO_2S$: S, 10.71. Found, S, 10.52.

(b) PREPARATION OF α,α,α-TRIFLUORO-6-(PHENYLTHIO)-m-TOLUIDINE, HYDROCHLORIDE

To a stirred solution of 29.9 g. of phenyl-α,α,α-trifluoro-2-nitro-p-tolyl sulfide in 200 ml. of 90% ethanol is added 55.8 g. of iron powder and 5 ml. of concentrated hydrochloric acid. After the spontaneous reaction which occurs has subsided, the mixture is heated to reflux for two hours and filtered while hot. The filtrate is then cooled and concentrated hydrochloric acid is added until no further precipitation occurs. The yield of air-dried product is about 20.7 g., M.P. about 170–177°.

Analysis.—Calcd. for $C_{13}H_{10}FNS \cdot HCl$: S, 10.49. Found: S, 10.66.

(c) PREPARATION OF α,α,α-TRIFLUORO-6-(PHENYLTHIO)-m-FORMOTOLUIDIDE

A mixture of 87.7 g. of α,α,α-trifluoro-6-(phenylthio)-m-toluidine hydrochloride, 36.8 g. of acetic anhydride and 226 g. of 98% formic acid is refluxed for 0.5 hour ond concentrated to dryness in vacuo. The syrupy residue crystallizes on trituration in ligroin to yield about 96.5 g. of product, which after recrystallization from ligroin is constant melting at about 65–66°.

Analysis.—Calcd for $C_{14}H_{10}F_3NOS$: S, 10.79. Found: S, 10.73.

(d) PREPARATION OF 8-(TRIFLUOROMETHYL)-DIBENZO[b,f][1,4]THIAZEPINE

A stirred mixture of 540 g. of polyphosphoric acid, 69.6 g. of phosphorus oxychloride and 67.5 g. of α,α,α-trifluoro-6-(phenylthio)-m-formotoluidide is heated under nitrogen in an oil bath maintained at 125–130° for 1.5 hours. The mixture is then poured into 2 kg. of finely crushed ice and then made alkaline with concentrated aqueous ammonia and extracted with ether. The extract is subsequently dried, the ether distilled and the residue extracted with ligroin to give, after cooling, about 37.3 g. of product, M.P. about 77–79°. Two additional recrystallizations from ligroin gives pure material of M.P. about 83–84°.

Analysis.—Calcd. for $C_{14}H_8F_3NS$: N, 5.01; S, 11.48. Found: N, 5.08; S, 11.35.

(e) PREPARATION OF 10,11-DIHYDRO-8-(TRIFLUOROMETHYL)DIBENZO[b,f][1,4]THIAZEPINE

A solfiution prepared by portionwise addition of 16.0 g. of anhydrous aluminum chloride to 500 ml. of cooled anhydrous ether is gradually added to a stirred suspension of 4.6 g. of lithium aluminum hydride in 500 ml. of ether, over which an atmosphere of dry nitrogen is maintained. To the mixture is added dropwise a solution of 25.2 g. of 8-(trifluoromethyl)-dibenzo[b,f][1,4]thiazepine in 750 ml. of anhydrous ether. The mixture is stirred for two hours, after which there is added dropwise 20 ml. of water (with external ice cooling) followed by 20 ml. of 20% sodium hydroxide. The reaction mixture is then filtered, dried and the ether removed by distillation to give about 22.4 g. of product M.P. about 99–100°.

Analysis.—Calcd, for $C_{14}H_{10}F_3NS$: N, 4.98; S, 11.40. Found: N, 4.89; S, 11.71.

EXAMPLE 3

*10,11-dihydro-dibenzo[b,f][1,4]thiazepine*

(a) PREPARATION OF 2-NITRODIPHENYLSULFIDE

Following the procedure of Example 1, step *a*, but substituting 157.6 g. of o-chloronitrobenzene for the 2,5-dichloronitrobenzene there is obtained about 240 g. of product, M.P. about 77–78°.

(b) PREPARATION OF o-(PHENYLTHIO)ANILINE

Following the procedure of Example 1, step *b*, but substituting 240 g. of 2-nitrodiphenylsulfide for the 4-chloro-2-nitrophenylphenyl sulfide there is obtained o-(phenylthio)aniline as an oil.

(c) PREPARATION OF 2-(PHENYLTHIO)FORMANILIDE

Following the procedure of Example 1, step *c*, but substituting 220 g. 2-(phenylthio)aniline for the 5-chloro-2-phenylthio)aniline, 2-(phenylthio)formanilide is obtained.

(d) PREPARATION OF DIBENZO[b,f][1,4]THIAZEPINE

Following the procedure of Example 1, step d, but substituting 44 g. of 2-(phenylthio)formanilide for the 5-chloro - 2 - (phenylthio)formanilide, dibenzo[b,f][1,4]thiazepine is obtained.

(e) PREPARATION OF 10,11-DIHYDRO-DIBENZO-[b,f][1,4]THIAZEPINE

Following the procedure of Example 1, step e, but substituting 2.2 g. of dibenzo[b,f][1,4]thiazepine for the 8-chlorodibenzo[b,f][1,4]thiazepine, 10,11-dihydrodibenzo[b,f][1,4]thiazepine, is obtained.

EXAMPLE 4

*2,8-dichloro-10,11-dihydro-dibenzo[b,f][1,4]thiazepine*

Following the procedure of Example 1, but substituting 120 g. of p-chlorobenzenethiol for the benzenethiol in step .a, yields 2,8 - dichloro-10-11-dihydro-dibenzo[b,f][1,4]thiazepine.

Similarly, if other substituted 2-chloronitrobenzenes and/or benzenethiols are substituted for the 2,5-dichloronitrobenzene and benzenethiol, respectively, in Example 1, step a, and the remaining steps of the example are carried out, correspondingly substituted 10,11-dihydro-dibenzo-[b,f][1,4]thiazepines are prepared. Thus, 5-methyl-2-chloronitrobenzene and 5-methoxy-2-chloronitrobenzene yield 8 - methyl - 10,11-dihydro-dibenzo[b,f][1,4]thiazepine and 8 methoxy 10,11-dihydro-dibenzo[b,f][1,4]thiazepine, respectively; whereas, p-toluenethiol, p-methoxy-benzenethiol, and p-trifluoromethylbenzenethiol give 2-methyl-10,11-dihydro - dibenzo[b,f][1,4]thiazepine, 2-methoxy-10,11-dihydro-dibenzo[b,f][1,4]thiazepine, and 2 - trifluoromethyl - 10,11 - dihydro-dibenzo[b,f][1,4]thiazepine, respectively.

EXAMPLE 5

*10,11-dihydro-11-phenyldibenzo[b,f][1,4] thiazepine*

(a) PREPARATION OF 2-(PHENYLTHIO)BENZANILIDE

To 4.8 g. of sodium hydroxide in 50 ml. of water at 0° is added 9.0 g. of o-(phenylthio)aniline, hydrochloride, 25 ml. of benzene and finally 5.9 g. of benzoyl chloride. The mixture is shaken about one hour, the benzene solution is separated dried an concentrated to give 9 g. of crude 2-(phenylthio)benzanilide, M.P. about 59–60°. Recrystallization from 95% ethanol gives the pure product, M.P. about 69–70°.

(b) PREPARATION OF 11-PHENYLDIBENZO[b,f][1,4]THIAZEPINE

Following the procedure of Example 1, step d, but substituting 40 g. of 2-(phenylthio)benzanilide for a 5-chloro-2-(phenylthio) formanilide, gives 11-phenyldibenzo[b,f][1,4]thiazepine, M.P. about 110–111°.

(c) PREPARATION OF 10,11-DIHYDRO-11-PHENYLDIBENZO[b,f][1,4]THIAZEPINE

A solution prepared from 9.3 g. of anhydrous aluminum chloride and 150 ml. of anhydrous ether is added dropwise to a stirred slurry of 2.66 g. of lithium aluminum hydride in 100 ml. of anhydrous ether and the mixture stirred an additional five minutes. To this mixture is added a solution of 10 g. of 11-phenyldibenzo[b,f][1,4]-thiazepine in 200 ml. of anhydrous ether. The reaction mixture is then stirred for one hour at room temperature and subsequently for a further hour at reflux temperature. The excess reducing agent is then destroyed by the consecutive dropwise addition of 5 ml. of water and 15 ml. of 20% sodium hydroxide solution to the ice cooled reaction mixture. The ether solution is then filtered and dried. After distillation of the ether the oily residue is crystallized by trituration in methanol to give about 9 g. of product, M.P. about 105–106°. Analysis Calcd. for $C_{19}H_{15}NS$: C, 78.85; H, 5.22; N, 4.84. Found: C, 78.28; H, 5.04; N, 4.97.

EXAMPLE 6

*10,11-dihydro-11-methyldibenzo[b,f][1,4]thiazepine*

Following the procedure of Example 5, but substituting 3.3 g. of acetyl chloride for benzoyl chloride in step a, 10,11-dihydro - 11 - methyldibenzo[b,f][1,4]thiazepine is obtained.

EXAMPLE 7

*10,11-dihydro-8-chloro-11-phenyldibenzo[b,f][1,4]-thiazepine*

Following the procedure of Example 5, but substituting 9.5 g. of 5-chloro-2-(phenylthio)aniline hydrochloride for the o-(phenylthio)aniline hydrochloride in step a, 10,11-dihydro-8-chloro-11-phenyldibenzo[b,f][1,4]thiazepine is obtained.

EXAMPLE 8

*10,11-dihydro-8-(trifluoromethyl)-11-phenyldibenzo-[b,f][1,4]thiazepine*

Following the procedure of Example 5, but substituting 10 g. of 5-trifluoromethyl-2-(phenylthio)aniline hydrochloride for the o(-phenylthio)aniline hydrochloride in step a, 10,11 - dihydro - 8 - (trifluoromethy)-11-phenyldibenzo[b,f][1,4]thiazepine is obtained.

EXAMPLE 9

*8-chloro-10,11-dihydro-10-(3-methylaminopropyl)-dibenzo[b,f][1,4]thiazepine*

(a) PREPARATION OF N-(3-CHLOROPROPYL)-N-METHYLFORMAMIDE

To a stirred suspension of 23.4 g. of sodamide in 400 ml. of dry toluene at 0–5°, is added 31.9 g. of N-methylformamide in 100 ml. of dry toluene. The reaction mixture is stirred for 2 hours at room temperature, 94.6 g. of trimethylene chlorobromide added, the mixture heated under reflux for 8 hours, filtered, concentrated, and distilled to give a 30% yield of N-(3-chloropropyl)-N-methylformamide, B.P. 148–150° (30 mm.), 140–142° (15 mm.).

(b) PREPARATION OF 8-CHLORO-10,11-DIHYDRO-10-[3-(N-METHYLFORMAMIDO)PROPYL]DIBENZO[b,f][1,4]THIAZEPINE

A stirred mixture of 12.4 g. of 8-chloro-10,11-dihydro-[b,f][1,4]thiazepine, 2.3 g. of sodamide, and 200 ml. of dry xylene is heated under reflux for 2 hours, cooled, a solution of 7.9 g. of the product from (a) above in 25 ml. of dry xylene added, and heating under reflux continued for 8 hours. The reaction mixture is filtered and the filtrate concentrated to give 13.2 g. of 8-chloro-10,11-dihydro - 10 - [3-(N-methylformamido)-propyl]dibenzo-[b,f][1,4]thiazepine, B.P. 203–205° (0.5 mm.).

(c) PREPARATION OF 8-CHLORO - 10,11 - DIHYDRO-10-(3-METHYLAMINOPROPYL)DIBENZO[b,f][1,4]THIAZEPINE

A solution of 11.0 g. of the product from step (b) in 29.2 ml. of 20% hydrochloric acid and 200 ml. of 95% ethyl alcohol is refluxed for 2.5 hours, concentrated, the residue added to 750 ml. of water, washed with ether, the aqueous solution made alkaline, extracted with ether, and the ether extracts concentrated to give 6.2 g. of 8-chloro - 10,11 - dihydro - 10 - (3-methylaminopropyl)dibenzo-[b,f][1,4]thiazepine, B.P. 196–198° (0.2 mm.).

(d) PREPARATION OF 8-CHLORO - 10,11 - DIHYDRO-10-(3-METHYLAMINOPROPYL)DIBENZO[b,f][1,4]THIAZEPINE, OXALATE

To 1 g. of the product from step (c) in 15 ml. of anhydrous ether is added 0.36 g. of oxalic acid in 5 ml. of acetone. The solid is recrystallized to give 0.5 g. of 8-chloro - 10,11 - dihydro - 10 - (3-methylaminopropyl)dibenzo-[b,f][1,4]thiazepine oxalate, M.P. 204–205° (dec.).

EXAMPLE 10

*10-(3methylaminopropyl)10,11-dihydro-8-(trifluoromethyl)dibenzo[b,f][1,4]thiazepine*

(a) PREPARATION OF 10-[3-(N-METHYLFORMAMIDO)PROPYL]-10,11-DIHYDRO - 8 - (TRIFLUOROMETHYL)DIBENZO[b,f][1,4]THIAZEPINE

By replacing the 8-chloro-10,11-dihydro-dibenzo[b,f]-[1,4]thiazepine in Example 9(b) with 14.2 g. of 10,11-dihydro - 8 - (trifluoromethyl)dibenzo[b,f][1,4]thiazepine there is obtained 16.2 g. of 10-[3-(N-methylformamido)-propyl] - 10,11-dihydro-8-(trifluoromethyl)-dibenzo[b,f]-[1,4]thiazepine.

(b) PREPARATION OF 10-(3-METHYLAMINOPROPYL)-10,11 - DIHYDRO - 8 - (TRIFLUOROMETHYL)DIBENZO[b,f][1,4]THIAZEPINE

By substituting 15.2 g. of the product from (a) for the 8 - chloro - 10,11 - dihydro-10-[3-(N-methylformamido)-propyl]dibenzo[b,f][1,4]thiazepine in Example 9(c), there is obtained 13.1 g. of 10-(3-methylaminopropyl)-10,11 - dihydro - 8-(trifluoromethyl)dibenzo[b,f][1,4]thiazepine.

EXAMPLE 11

*8-chloro-10,11-dihydro-10-(3-methylaminopropyl)11-phenyldibenzo[b,f][1,4]thiazepine*

(a) PREPARATION OF 8-CHLORO-10,11-DIHYDRO-10-[3-(N - METHYLFORAMIDO)PROPYL] - 11 - PHENYL-DIBENZO[b,f][1,4]THIAZEPINE

Following the procedure of Example 9(b), but substituting 16.2 g. of 8-chloro-10,11-dihydro-11-phenyldibenzo[b,f][1,4]thiazepine gives 14.9 g. of the above product.

(b) PREPARATION OF 8-CHLORO-10,11-DIHYDRO-10-(3-METHYLAMINOPROPYL) - 11 - PHENYLDIBENZO[b,f][1,4]THIAZEPINE

Following the procedure of Example 9(c), but substituting 14.0 g. of the product from Example 11(a) for the 8-chloro-10,11-dihydro-10-[3-(N-methylformamido)-propyl]dibenzo[b,f][1,4]thiazepine, there is obtained 7.9 g. of 8-chloro-10,11-dihydro-10-(3-methylaminopropyl)-11-phenyl dibenzo[b,f][1,4]thiazepine.

EXAMPLE 12

*Preparation of N-(3-chloropropyl)-N-methylbenzylamine*

(a) To a cooled, stirred solution of 72.6 g. of N-methylbenzylamine, in benzene, are added dropwise 38.1 g. of 3-chloropionyl chloride and the mixture heated under reflux for 5 hours, cooled, filtered, the filtrate concentrated, and the residue distilled to give 41.3 g. of N-benzyl-3-chloro-N-methylpropionamide, B.P. 132–135° (0.6 mm.), $n_D^{26}$ 1.5418. A solution of 20.0 g. of the amide in 200 ml. of anhydrous ether is added dropwise to a stirred suspension of 3.8 g. of lithium aluminum hydride in 200 ml. of anhydrous ether and the mixture heated under reflux for 1 hour, cooled, treated with 2.5 ml. of water and 2.5 ml. of 20% aqueous sodium hydroxide, filtered, the filtrate dried, concentrated, and the residue distilled to give 13.8 g. of N-(3-chloropropyl)-N-methylbenzylamine, B.P. 89–91° (1 mm.), $n_D^{25}$ 1.5145.

(b) A stirred mixture of 85 g. of N-methylbenzylamine, 31.2 g. of sodamide, and 1 l. of toluene is heated under reflux for 1 hour, cooled, 134 g. of 1-bromo-3-chloropropane added dropwise and heating under reflux continued for 16 hours. The reaction mixture is then filtered and fractionally distilled to give 38 g. of N-(3-chloropropyl)-N-methylbenzylamine.

EXAMPLE 13

*Preparation of 10 - [3 - (benzylmethylamino)propyl] - 8 - chloro - 10,11 - hihydrodibenzo[b,f][1,4]thiazepine*

A mixture of 13.0 g. of 8-chloro-10,11-dihydrodibenzo[b,f][1,4]thiazepine, 2.5 g. of sodamide, and 250 ml. of dry xylene is heated under reflux for 3 hours, cooled, 12.8 g. of N-(3-chloropropyl) - N - methylbenzylamine added, dropwise, and heating under reflux continued for 10 hours. The reaction mixture is filtered, extracted with 250 ml. of 5% HCl, the acid extract made alkaline, extracted with ether, the ether extract dried, concentrated, and residue distilled to give 13.8 g. of 10-[3-(benzylmethylamino)propyl] - 8 - chloro - 10,11 - dihydrodibenzo - [b,f][1,4]thiazepine, B.P. 247–249° (0.2 mm.). The salt of this base with one mole of oxalic acid has a M.P. of 138–139°.

EXAMPLE 14

*Preparation of 8 - chloro - 10,11 - dihydro - 10 - (3 - methylaminopropyl)dibenzo[b,f][1,4]thiazepine*

A solution obtained by neutralization of 125 g. of N-(3-chloropropyl) methylamine, hydrochloride in 65 ml. of water with 72 ml. of 50% aqueous sodium hydroxide and extraction of the free base with 450 ml. of toluene, is added, dropwise, to a stirred, cooled mixture of 89 g. of acetic anhydride an 80 g. of formic acid. The reaction mixture is then kept at 65° for 0.5 hour and then at 80° for an additional 0.5 hour, and fractionally distilled to give 47.4 g. of N-(3-chloropropyl)-N-methylformamide, B.P. 125–128° (15 mm.). Proceeding as in Example 13 but replacing N-(3-chloropropyl)-N-methylbenzylamine by 8.8 g. of N-(3-chloropropyl)-N-methylformamide there are obtained 12.0 g. of 8-chloro-10,11-dihydro-10-[3 - (N - methylformamidopropyl]dibenzo[b,f][1,4] - thiazepine. Hydrolysis of this material by the procedure already described in Example 9 gives 4.5 g. of 8-chloro-10,11 - dihydro - 10 - (3 - methylaminopropyl)dibenzo[b,f][1,4]thiazepine.

EXAMPLE 15

*Preparation of 8 - chloro - 10,11 - dihydro - 10 - (3 - methylaminopropyl)dibenzo[b,f][1,4]thiazepine dihydrobromide*

(a) A solution of 4.1 g. of 10-[3-(benzylmethylamino)-propyl] - 8 - chloro - 10,11 - dihydrodibenzo[b,f][1,4] - thiazepine and 2.6 g. of benzylchloroformate in 50 ml. of dry benzene is heated under reflux for 16 hours, cooled, extracted with 100 ml. of 5% hydrochloric acid, washed with water, dried, and concentrated in vacuo to give 3.9 g. of [(8 - chloro 10,11 dihydrodibenzo[b,f][1,4]thiazepin-10-yl)propyl]methylcarbamic acid, benzyl ester, as a viscous oil. To a solution of 3.0 g. of [(8-chloro-10,11 - dihydrodibenzo[b,f][1,4]thiazepine - 10 - yl) - propyl]methylcarbamic acid, benzyl ester, in 15 ml. of glacial acetic acid are added 15 ml. of a 30% solution of hydrobromic acid in glacial acetic acid and the mixture kept at room temperature for 3 hours. The product is then precipitated with 100 ml. of anhydrous ether and recrystallized from a mixture of absolute alcohol and anhydrous ether to give 1.1 g. of 8-chloro-10,11-dihydro-10 - (3 - methylaminopropyl)dibenzo[b,f][1,4]thiazepine dihydrobromide, M.P. 174–175° (dec.).

(b) By replacing the benzyl chloroformate in Example 15, section (a), with 2.2 g. of ethyl chloroformate there is obtained by a similar procedure 3.9 g. of [(8-chloro - 10,11 - dihydrodibenzo[b,f][1,4]thiazepine - 10 - yl)propyl]methylcarbamic acid, ethyl ester.

To a solution of 6.0 g. of the [(8-chloro-10,11-dihydrodibenzo[b,f][1,4]thiazepin - 10 - yl)propyl]methyl - carbamic acid, ethyl ester, in 5 ml. of glacial acetic are added 30 ml. of a 30% solution of hydrobromic acid in glacial acetic acid. The mixture is allowed to stand at 20–25° for 48 hours, and after work up as above in section (b) gives 5.0 g. of 8-chloro-10,11-dihydro-10-(3-methylaminopropyl)dibenzo[b,f][1,4]thiazepine, dihydrobromide.

EXAMPLE 16

*Preparation of 8 - chloro - 10 - (3 - dibenzylamino - propyl) - 10,11 - dihydrodibenzo[b,f][1,4]thiazepine*

Following the procedure of W. S. Gump and E. J. Nikawitz described in Example 1 of U.S. Patent No. 2,504,977 but replacing the monoethanolamine with 751 g. of monopropanolamine there is obtained 775 g. of 3-dibenzylamino-1-propanol, B.P. 146–149° (0.1 mm.), $n_D^{23}$ 1.5622. A solution of 508 g. of this material in 500 ml. of chloroform is treated with a solution of 276 g. of thienyl chloride in 300 ml. of chloroform to give N-(3-chloropropyl)-dibenzylamine hydrochloride, M.P. 130–131°. Following the procedure disclosed in Example 13 but substituting for N - (3 - chloropropyl) - N - methylbenzylamine 17.8 g. of N-(3-chloropropyl)dibenzylamine there is obtained 16.4 g. of 8 - chloro - 10 - (3 - dibenzylaminopropyl) - 10,11-dihydrodibenzo[b,f][1,4]thiazepine.

EXAMPLE 17

*Preparation of 10-(3-benzylaminopropyl)-8-chloro-10,11-dihydrodibenzo[b,f][1,4]thiazepine*

(*a*) Replacing the 10-[3-benzylmethylamino)propyl]-8-chloro-10,11-dihydrodibenzo[b,f][1,4]thiazepine in Example 15, by 4.9 g. of 8-chloro-10-(3-dibenzylaminopropyl)-10,11 - dihydrodibenzo[b,f][1,4]thiazepine and following the procedure described in section (*b*) there is obtained 10-(3-benzylaminopropyl) - 8-chloro-10,11-dihydrodibenzo[b,f][1,4]thiazepine dihydrobromide.

(*b*) Similarly, replacing the 10-[3-(benzylmethylamino)propyl] - 8 - chloro - 10,11 - dihydrodibenzo[b,f][1,4]thiazepine in Example 15 by 4.9 g. of 8-chloro-10-(3-dibenzylaminopropyl) - 10,11 - dihydrodibenzo[b,f][1,4]thiazepine and replacing the benzyl chloroformate by 2.2 g. of ethyl chloroformate there is obtained by following the procedure described in section (*b*) 10-(3-benzylaminopropyl) - 10,11-dihydrodibenzo[b,f][1,4]thiazepine dihydrobromide.

EXAMPLE 18

*8-(trifluoromethyl)-10-(3-methylaminopropyl)-10,11-dihydrodibenzo[b,f][1,4]thiazepine*

A mixture of 8.5 g. of 8-(trifluoromethyl)-10,11-dihydrodibenzo[b,f][1,4]thiazepine, 100 ml. of dry toluene and 1.3 g. of sodamide are refluxed for one-half hour, sooled in ice and treated with 37.8 ml. of a 1.2 M solution of N-(3-chloropropyl)-N-methylformamide in xylene as in Example 9(*b*) to give 8-(trifluoromethyl)-10,11-dihydro - 10 - [3 - (N - methylformamido)propyl]dibenzo[b,f][1,4]thiazepine; this, then treated with hydrochloric acid as in Example 9(*c*), gives 8-(trifluoromethyl)-10-(3-methylaminopropyl) - 10,11 - dihydrodibenzo[b,f][1,4]thiazepine.

EXAMPLE 19

*8-chloro-10-(2-dibenzylaminoethyl)-10,11-dihydrodibenzo[b,f][1,4]thiazepine*

A mixture of 19.9 g. of 8-chloro-10,11-dihydrodibenzo[b,f][1,4]thiazepine, 200 ml. of dry toluene and 3.7 g. of sodamide is refluxed for one-half hour, cooled in ice and treated with 123 ml. of a 0.98 M solution of 2-dibenzylaminoethyl chloride in dry toluene. The mixture is stirred and refluxed for five hours, and worked up to give 17.5 g. of 8-chloro-10-(2-dibenzylaminoethyl)-10,11-dihydrodibenzo[b,f][1,4]thiazepine.

EXAMPLE 20

*8-chloro-10-(2-benzylaminoethyl)-10,11-dihydrodibenzo[b,f][1,4]thiazepine*

(*a*) Following the procedure of Example 13, but substituting 16.9 g. of N-(2-chloroethyl)dibenzylamine for the N-(3-chloropropyl)dibenzylamine there is obtained 8-chloro - 10 - (2-dibenzylaminoethyl) - 10,11-dihydrodibenzo[b,f][1,4]thiazepine.

(*b*) Replacing the 10-[3-(benzylmethylamino)propyl]-8-chloro - 10,11 - dihydrodibenzo[b,f][1,4]thiazepine in Example 15 by 4.8 g. of 8-chloro-10-(2-dibenzylaminoethyl)-10,11-dihydrodibenzo[b,f][1,4]thiazepine and following the procedure described in section (*b*), there is obtained 10 - (2 - benzylaminoethyl) - 10,11 - dihydrodibenzo[b,f][1,4]thiazepine dihydrobromide.

EXAMPLE 21

*8-chloro-10(3-p-methylbenzylaminopropyl)-10,11-dihydrodibenzo[b,f][1,4]thiazepine*

(*a*) Following the procedure of Example 16, and employing monopropanolamine and p-ethylbenzyl chloride, there is obtained N-(3-chloropropyl)di-(p-methylbenzyl) amine. Following the procedure of Example 13, but substituting for the N-(3 - chloropropyl) - N - methylbenzylamine, 19.6 g. of N-(3-chloropropyl)-di-(p-methylbenzyl) amine there is obtained 8-chloro - 10 - [3 - di-(p-methylbenzyl)aminopropyl] - 10,11 - dihydrodibenzo[b,f][1,4] thiazepine.

(*b*) By replacing the 10-[3-benzylmethylaminopropyl]-8-chloro-10,11-dihydrodibenzo[b,f][1,4]thiazepine in Example 15 by 5.2 g. of 8-chloro-10-[3-di-(p-methylbenzyl) aminopropyl] - 10,11-dihydrodibenzo[b,f][1,4]thiazepine and following the procedure described in section (*b*), there is obtained 10-(2-p-methylbenzylaminopropyl)-10,11-dihydrodibenzo[b,f][1,4]thiazepine dihydrobromide.

What is claimed is:

1. A compound selected from the group consisting of bases of the formula

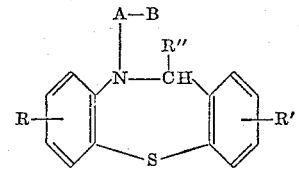

wherein A is lower alkylene of at least two carbon atoms, B is selected from the group consisting of lower alkylamino, benzylamino, lower alkylbenzylamino and dibenzylamino, at least one of R and R' is selected from the group consisting of halogen and lower alkoxy, R'' is hydrogen; and non-toxic acid-addition salts thereof.

2. 8-halo - 10 - [(lower alkyl)amino(lower alkylene)]-10,11-dihydrodibenzo[b,f][1,4]thiazepine.

3. 8-chloro-10,11-dihydro-10 - (3-methylaminopropyl) dibenzo[b,f][1,4]thiazepine.

4. A non-toxic acid-addition salt of the compound of claim 2.

5. A compound of the formula

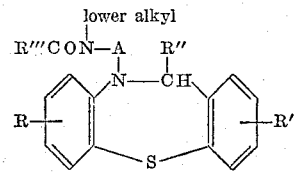

wherein A is lower alkylene of at least two carbon atoms, R and R' are each selected from the group consisting of hydrogen, halogen, lower alkyl, lower alkoxy and trifluoromethyl, R'' is selected from the group consisting of hydrogen, lower alkyl, phenyl, lower alkylphenyl, di-lower alkylphenyl, lower alkoxyphenyl and halophenyl, and R''' is selected from the group consisting of hydrogen and lower alkyl.

6. 8-halo-10,11-dihydro-10 - [(N-lower alkylformamido)lower alkylene]-dibenzo[b,f][1,4]thiazepine.

7. 8-chloro - 10,11 - dihydro - 10 - [3-(N-methylformamidopropyl)]dibenzo[b,f][1,4]thiazepine.

References Cited by the Examiner
UNITED STATES PATENTS

| | | | |
|---|---|---|---|
| 2,830,987 | 4/58 | Gailiot et al. | 260—243 |
| 2,852,528 | 9/58 | Hoffmann et al. | 260—327 |
| 3,004,028 | 10/61 | Dolliver et al. | 260—327 |
| 3,038,896 | 6/62 | Habicht et al. | 260—327 |

FOREIGN PATENTS 866,791  5/61  Great Britain.

OTHER REFERENCES

Meduna et al.: Jour. of Neuropsychiatry, volume 2, No. 5, pages 232–37, June 1961.

Protiva et al.: Experientia, volume 13 (1957), pages 291–2.

Pulver et al.: Arzneimittel, Forschung, volume 10, No. 7, July 1960, pages 530–533.

Yale: Jour. of Medicinal and Pharmeaceutical Chemistry, volume 1, No. 2, pages 121–31.

WALTER A. MODANCE, *Primary Examiner.*

NICHOLAS S. RIZZO, *Examiner.*